June 23, 1936.    A. KÄSTNER    2,045,086
ELASTIC CLUTCH
Filed July 25, 1931    4 Sheets-Sheet 2

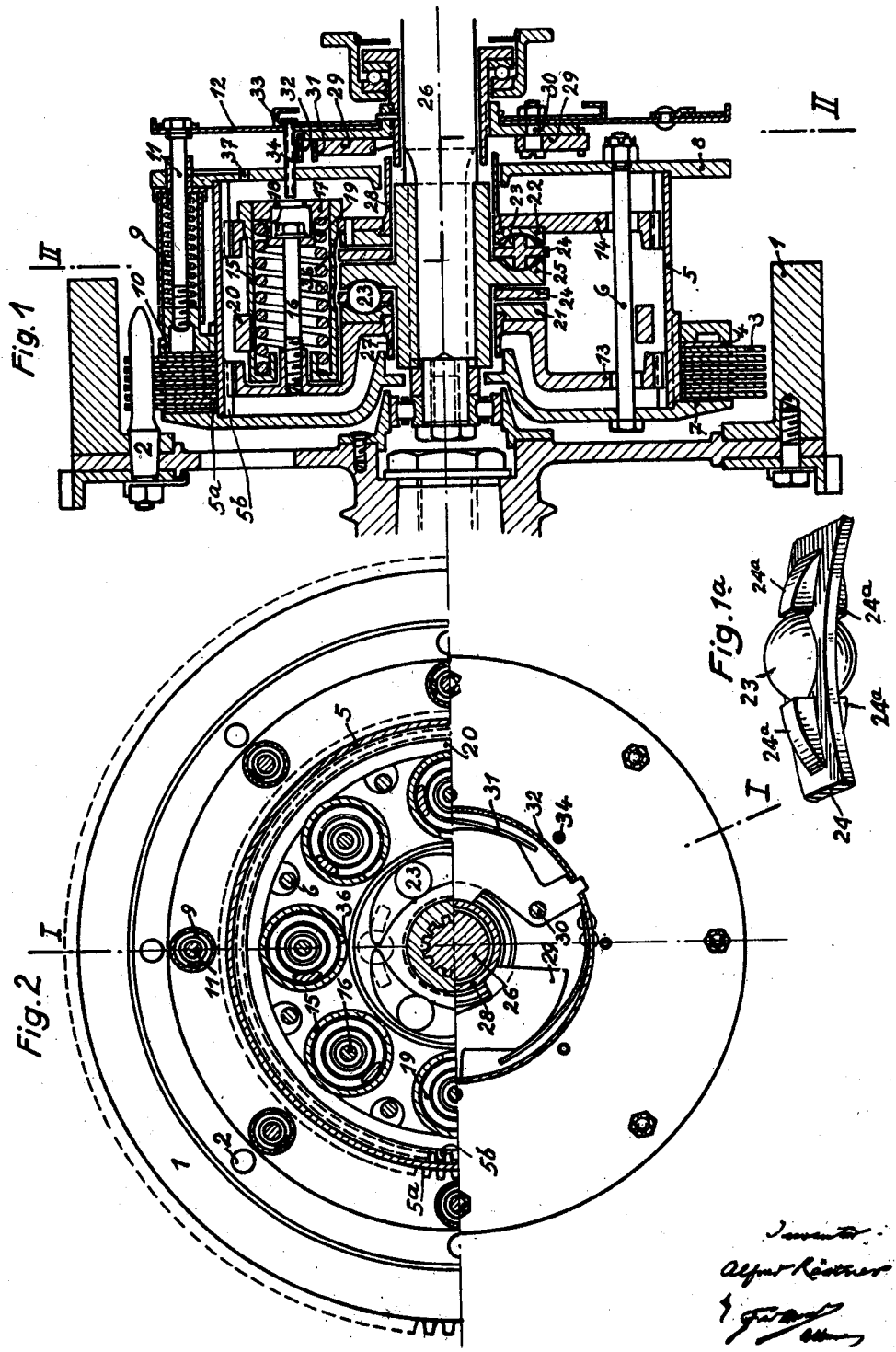

June 23, 1936. A. KÄSTNER 2,045,086
ELASTIC CLUTCH
Filed July 25, 1931 4 Sheets-Sheet 3
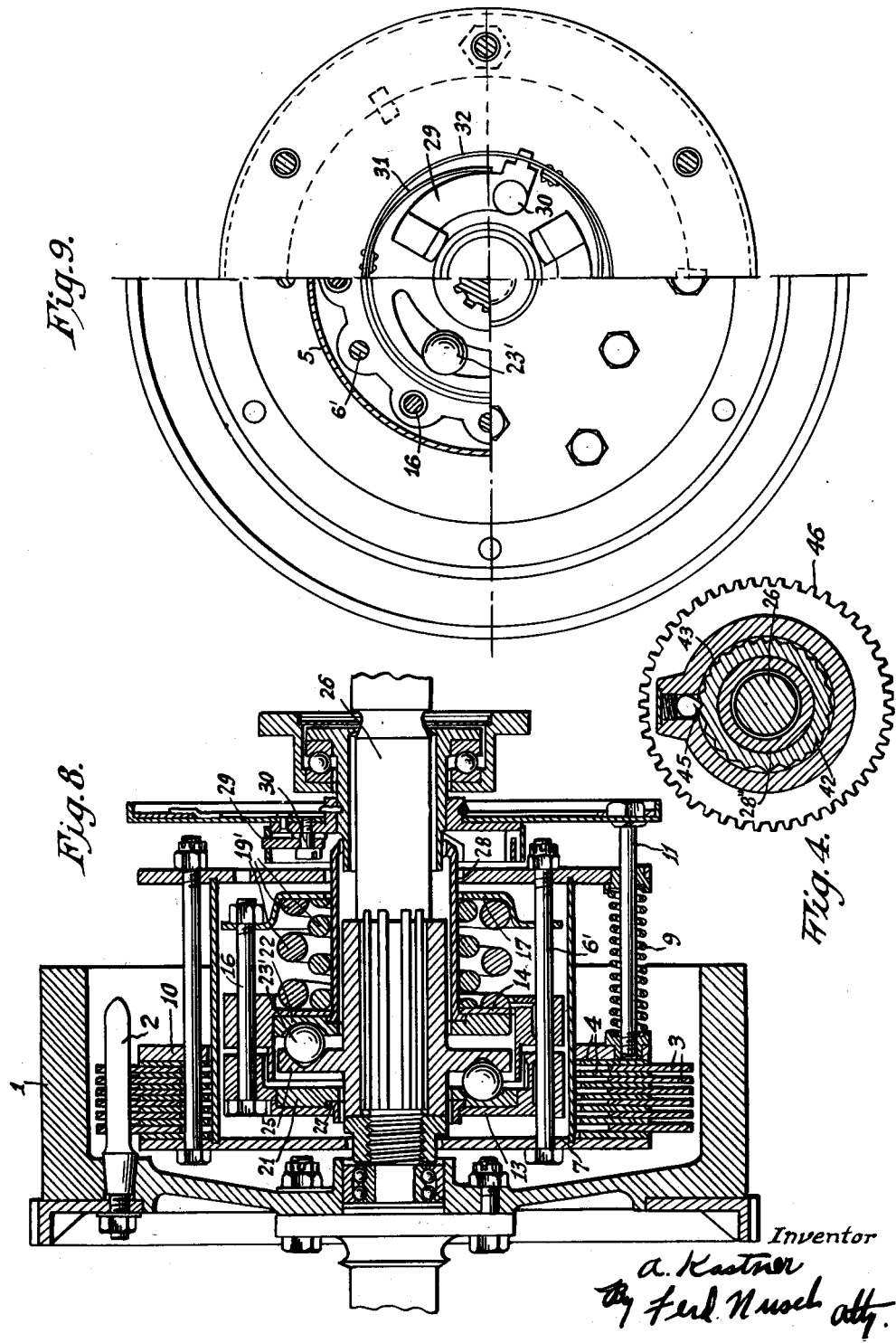

Patented June 23, 1936

2,045,086

UNITED STATES PATENT OFFICE 2,045,086

ELASTIC CLUTCH

Alfred Kästner, Berlin-Lichterfelde, Germany

Application July 25, 1931, Serial No. 553,143
In Germany July 28, 1930

14 Claims. (Cl. 192—56)

This invention relates to an elastic coupling combined with a second coupling or clutch and having control plates which are pressed towards one another by means of spring forces and between which are situated rolling members arranged in grooves in one or both sides of the plates, the torque being transmitted from one plate to another through said rolling members and at least one of which plates transmits torque to any other desired part of a larger circle than that on which the members roll.

The elastic coupling may be employed in conjunction with a coupling or clutch of non-elastic construction and moreover the latter may be of various forms. A further invention consists in that the limit moment of the coupling can be made adjustable as desired or the action of the elastic coupling or the other coupling element co-operating therewith may be effected so that either this limit moment remains as long as an overloading lasts (clutch slip) or the moment can be equal to zero (for example) by disengagement of the coupling.

A further improvement is attained in that the influencing of the limit value takes place in dependency upon the position or the moving condition of any parts.

Of particular importance is the inventive idea of carrying out in dependency upon the loaded condition of the clutch any operations which are utilized for actuating switching, indicating and recording devices. The disengagement of the driving engine on attaining a certain turning moment is a particularly simple characteristic example.

The coupling can be actuated by hand, or automatically, it can serve for converting pulsating movement into uniform movement or uniform movement into pulsating movement.

Several embodiments of the invention are illustrated by way of example in the accompanying drawings in which:—

Fig. 1 is a cross sectional view taken on line 1—1 of Figure 2, showing one form of a coupling and clutch, and Fig. 1a is a detail perspective of a clutch ball-holder.

Fig. 2 is a part sectional view taken on line II—II of Fig. 1.

Fig. 4 is a sectional view taken on line 4—4 of Figure 6.

Figure 8 is a side sectional view of another form of coupling and clutch;

Figure 9 is a part sectional end view of the device shown in Figure 8;

Figure 11:
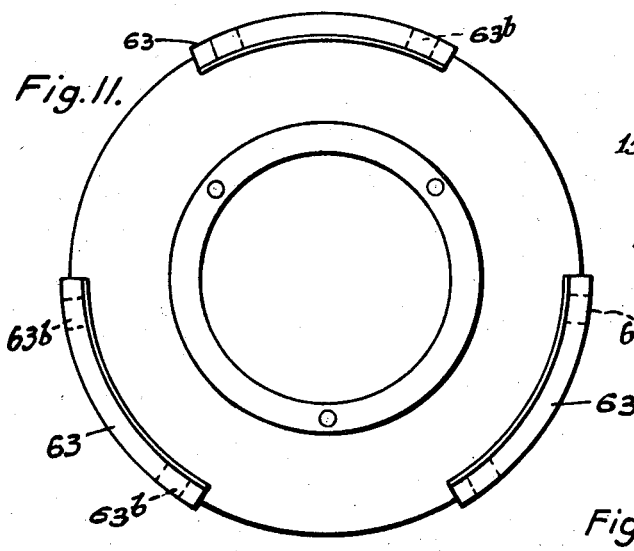
Figure 11 is a plan view of a detail of the invention.

Figs. 1 and 2 illustrate a combined clutch and elastic coupling which is particularly suitable for medium and heavy motor vehicles. The coupling illustrated in Figures 1 and 2 is suitable for easy starting, smoothing torque impulses, automatic actuation of the clutch in dependency upon the amount of torque and voluntary change of the actuating torque, synchronizing during gear changing and the like. The above-mentioned problems occur also in the case of clutches in all possible spheres of general machine construction.

The clutch represented in Figs. 1 and 2 consists in its fundamental elements of a spring-loaded multi-plate clutch, including the plates or discs 3 and 4, which is connected by means of a tooth-and-spring coupling with the driven shaft. In addition to the control members of the spring coupling, there is provided a starting regulator which, up to a definite fundamental speed of rotation of the driven shaft 26, limits the starting torque to a definite value which lies below the full-load engine torque.

In the fly-wheel 1, which as usual is connected with the crank shaft of the engine, there are fixed pins 2 which project and engage with the outer discs 3 which they serve to drive. The inner discs 4 engage in teeth 5a formed externally on the cylinder 5. Cover plates 7 and 8 are pressed on to the ends of the cylinder 5 by means of the bolts 6 and form closing and guiding plates. Loading springs 9 mounted in protective and guiding tubes rest at one end against 8 and press at the other end on the discs 3 and 4 by way of the pressure ring 10, as long as they are not prevented in this by retraction of a plate 12 and draw rods 11 the latter being secured at one end to the ring and passing coaxially through the springs and beyond the plate 8. The cylinder 5 is also provided with internal teeth 5b. The pressure rings 13 and 14 engage in these internal teeth 5b and are loaded through the intermediary of the spring pots 15, the draw-bolts 16 and the spring plates 17 by the eight strong springs 19. Each pot 15 is secured at its right-hand end to the pressure ring 14. The plate 17, which slides freely in the right-hand open end of the pot 15, is connected to the plate 13 by the bolt 16 which passes co-axially through the spring 19 one end of which abuts against the inturned left-hand end of the pot and the other against the inside of the plate 17. Thus the springs 19, which are in compression act to urge the two plates 13 and 14 towards one another. The ring 20 takes up the edging tendency which acts on the spring pots during rotation. The pressure rings 13 and 14 transmit the spring forces and torques of the coupling to the control plates 21 and 22, which rest on the control balls 23 which in turn rest against the common control plate 25 rigidly connected with the driven shaft 26. In the control plates three channel-like grooves of arcuate section for the reception of the control balls are milled on a circle, the depth of each of which grooves decreases from the deepest position in the axial direction at first only slightly and then rectilinearly; that is to say, a section on the pitch circle shows, when developed, (see Fig. 3), two straight lines inclined to the surface of the plates at definite angles, these two straight-lines being connected with one another by a constant slightly-curved curve. It will be seen that the circle on which the control balls run is of smaller diameter than the circle at the outer edge of the plates 13 and 14 (Fig. 1) where the torque is transmitted to the control plates 21 and 22 from the other part 5 of the coupling. As a result of this arrangement, with the torque loading rising from zero, the control plates 21 and 22 are moved away from one another in the axial direction such a distance until on one side the control sleeve 27 abuts against the cover plate 7 and on the other side the control sleeve 28 abuts on the plate 12 and by means of the rods 11 compresses the clutch loading springs 9; then the clutch begins to slip under this maximum torque, which is determined by the construction. If the torque falls even slightly, then slipping immediately ceases, and there then operates between engine and driven shaft or change speed gear only the elastic coupling, including the toothed coupling 5b.

As the maximum slipping moment of the coupling is about 5 to 10% above the maximum moment of the driving engine so that the coupling under normal load does not slip accidently, there is a danger of the driving engine stopping when running at a low speed owing to a sudden overloading or in the case of difficult starting up. In order to avoid this the starting torque is reduced up to a definite speed of rotation of the driven shaft, for example ⅕th normal speed of rotation, by a certain amount, say 10 to 20%. The springs of the coupling must, corresponding to this reduction, exert (by means of their control bushes 27 and 28) their regulating action on the friction clutch earlier. This is made possible by the starting regulator, which consists of the three starting weights 29, which are rotatably mounted on pins 30 carried by the plate 12 and are pressed into the innermost position by springs 31. The starting weights 29 at a point where they lie between the bush 28 and plate 12, must be made so thick that the control of the friction coupling by the control plates 21 and 22 owing to their reduced free stroke, takes place at the desired low moment.

Shortly after the vehicle is started, the weights move outwards so that automatic control occurs from this speed of rotation at the maximum torque, which lies above the maximum engine torque. While the normal driving speed of rotation prevails the weights rest against a loose steel ring 32, so that the springs 31 and pivot pins 30 shall not be overloaded. As is indicated in Fig. 2, the weights 29 are provided externally with small noses, which engage in holes in the ring 32 and so secure it to the weights. In the condition of working illustrated, the weights 29 form by means of their inner segment-like shoulders, a stroke limiting device for the sleeve 28 and the control plate 22. As seen in Fig. 2 of the drawings, the weights are so mounted that, during starting and a left-handed rotation, additional torques, which are dependent on the tangential acceleration, are added to the torques exerted as a result of centrifugal force. Both torques tend on their addition to force the weights against the steel ring 32 by overcoming the force of the springs 31. The dependency on acceleration is increased by the ring 32. On right handed rotation the above mentioned acceleration torque acts against the centrifugal torque.

Particularly good lubrication is provided for the parts which move with respect to one another. From an oil catching ring 33 the oil arrives through the small steel tubes 34 into a hollow space of the spring plate 17. From here it passes through small conduits 18 into the spring pot 15. The excess oil reaches the cylinder 5 and here forms an oil ring the thickness of which is determined by the position of the exit openings 37. In the stationary condition or during stopping and starting, the oil remaining in the spring pots flows over the control balls through large holes 36 arranged on the side towards the shaft axis. During driving sufficient lubrication of the control members is ensured by oil vapour. The control balls 23 are guided by strong bronze cages 24, which furthermore possess guiding lugs or pins 24a so that the cages always occupy their correct position.

Of particular importance is the torque moment in dependency upon the angle of twist of the control disc 25 relative to the control discs 21 and 22.

Figure 3:
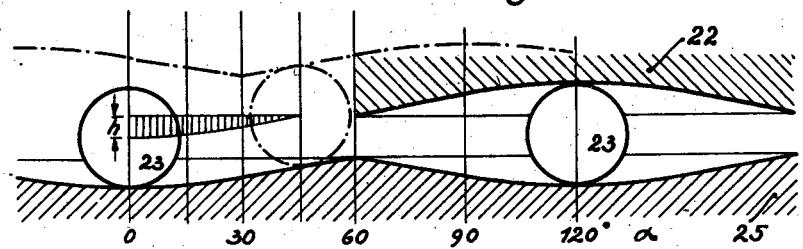
Fig. 3 shows a sectioned development on the pitch circle of the control grooves.

Fig. 3 shows a sectioned development, in the pitch circle, of the control grooves of the control plates 22 and 25. For the present example a twist angle of ± 90° was chosen. The control balls 23 must therefore at the greatest limiting torque move into the position illustrated in dot and dash by $\alpha=45°$ from 0°, 120° and 240° respectively, so that the two control plates 22 and 25 rotate with respect to one another by $\rho=90°$. The control plates execute hereby a movement which in its actual value is equal to double the movement of the ball. The ordinates of the cross-hatched surface show the movement of the ball provided at each point. The spring compression is, as both the control plates move by the same amount, equal to double that value.

As a result of the provision of a starting regulator the driver can, so far as the resistance of the road allows of it, start with any gear, for with a full supply of fuel the engine torque always lies above the transmission load torque which plus the acceleration torque is the static torque of the transmission, the engine torque being above the static torque, the motor can therefore always be accelerated. If the car, in consequence of an extraordinary large obstacle, does not start after engagement of the clutch, then the latter slips and thus prevents the engine from being stalled.

By means of the three small starting weights, which do not render the clutch much more expensive, there is obtained just as certain a starting as with the employment of a centrifugal clutch. With the latter, however, it is necessary that the speed of rotation on engagement should be relatively high. This is, however, disadvantageous, as below this speed of rotation there can be on drive. In the neighbourhood of this speed of rotation a centrifugal clutch will constantly cut in and out, that is hunt. The torque coupling is free from these disadvantages.

Figure 5:
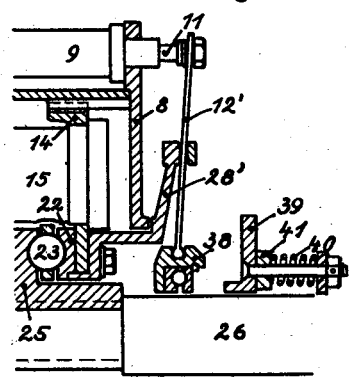
Figs. 5 and 6 are sectional elevations of modifications.

Fig. 5 illustrates an example of the operating device for a combined clutch and coupling similar to Figs. 1 and 2. The control sleeve 28' which is firmly connected with one end of the control plate 22 here carries a flange plate, which serves as a thrust block for the actuating lever 12'. The actuating lever or the parts which co-operate with it are preferably resilient. At the outer circumference the actuating lever engages in the draw bolt 11. The other end of this lever is connected with the ring 38. The actuating ring 39 can be displaced by the clutch pedal in the longitudinal direction of the shaft, the ring 39 moving to the left and compressing the springs 9 through the levers 12' when the driver presses on the pedal. Two or more springs 40 ensure that the ring 39, after the clutch pedal becomes free always returns into its outer position against the abutment 41. This position corresponds to the greatest possible limiting torque. If the driver treads fully on the cutch pedal the clutch is opened as usual; if he lets the pedal go back gradually then he releases thereby a larger or smaller stroke of the clutch springs and varies the limiting torque so that it rises from zero upwards. As a result of this arrangement the driver has the starting process always perfectly in hand. During working the magnitude of the torque at any time is given by the position of the ring 38.

With small clutches it is advisable as compared with Figs. 1 and 2 and having regard to price and diameter, to provide one or more co-axially arranged springs 19' (Fig. 8) instead of the eight springs and spring pots arranged as described above. The tooth coupling between the cylinder 5 and the plates 13, 14 is preferably replaced by the cheaper pin connection, in which the bolts 6', seen in Fig. 8, are employed at the same time as the transmission members. In order also to obtain a proper guiding of the control balls 23' without the use of a cage there are employed (instead of the control grooves of arcuate cross sections) at least on one side of each row of balls, triangular wedge-like cross-sections, while on the other side there can be provided an optional form.

In the above explanation it has been shown what advantages the new clutch and coupling has in automobile construction. Similar considerations apply in the use of motor vessels, Diesel locomotives and other vehicles. The main advantages which this new clutch and coupling affords in these cases are again set out briefly below:—

(1) Certain and gentle starting with any desired gear, no stalling of the engine—not even with direct drive—and no unnecessarily lengthy clutch slip. As the torque is accurately adjustable and may be adjusted to be lower than the engine torque the clutch may be left in before the vehicle brake is taken off. Consequently running back of the car on a slope cannot then occur.

(2) Uniform torque in spite of the strongest power impulses and torque shocks—even at the lowest speeds of rotation and with four or even one cylinder, therefore long life, noiseless running—even in indirect gear—and no unpleasant rotational oscillations.

(3) Easy opening of the clutch, because the plate loading is small at the commencement and only increases with rising torque.

(4) Continuous control of the torque.

(5) Quicker gear change without clutch actuation.

Figure 6:
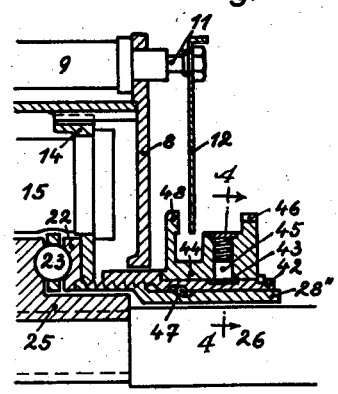

The new clutch and coupling is, however, also advantageously applicable to other kinds of drive in the same or a similar form of construction. From the example illustrated in Figs. 4 and 6 it may be seen how a change in the characteristic of the clutch is made possible dependent upon the angle through which the clutch turns and the direction of rotation of the clutch. From this example it may also be seen how the controlling parts can be applied simultaneously to the operation of control devices of any kind, which for example act on the driving motor, cut it in and out, regulate its speed of rotation or even influence other machines and apparatus. In order to bring the parts into their initial position illustrated in Fig. 6, the motor must be reversed.

The main parts of the clutch correspond to those of Figs. 1 and 2. The control sleeve 28'' which is firmly connected with the one control plate 22, carries an external thread. In this engages the internal thread of the intermediate sleeve or collar 42. This sleeve has fine teeth 43 on its exterior, in which teeth there engages the spring-loaded reversing blade 45 which is carried in the flange member 44. A spring ring 40 ensures that the flange member, which is mounted loosely on 42, takes part in the axial motion of the intermediate sleeve. In the flange member 44 are formed teeth 46 which serve to operate the actuating device (not shown). If the clutch commences to rotate then, as the flange body 44 cannot turn with it because of the resistance of the actuating device, the intermediate sleeve and with it the flange member itself are first moved axially towards the right on the control sleeve. The axial displacement is limited by balls 47 which are situated in annular grooves in the parts 42 and 28''.

The balls are gripped in the limiting position of the intermediate sleeve or collar 42 and thus 42 is coupled to 28'', so that 42 rotates with 28''. The sudden taking-up of 42 causes the reversing pawl 45 to move outwards and the increased load resistance between 42 and the teeth 43 to disappear. The pawl slides over the teeth without any expenditure of power worth mentioning. If as a result of greater resistance to motion the torque of the clutch is exceeded, then as a result of the action of the control balls 23, plate 22, and therefore 48 moves towards the right until the member 48 presses against the plate 12. The member 48, which up to now has not been rotating, is as a result of the resulting friction torque taken up by the rotating plate 12 of the clutch and operates by means of the crown wheel 46 the actuating device (which is not illustrated). The position of the reversing pawl 45 remains unchanged during this process.

If the driving shaft changes its direction, then the reversing pawl 45, independently of whether the intermediate sleeve 42 was in the end position or not, first holds the sleeve 42 fast so that 42 screws back on 28''. This return motion is again limited by the balls 47. In the limiting position the pawl 45 is moved back so that 42 rotates at the same rotational speed as the clutch. Now the large stroke of the control device—distance between 48 and 12—is again reinstated as it was at the commencement.

Figure 10:
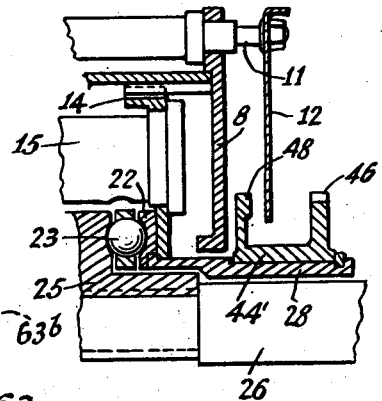
Figure 10 is a sectional view of another modification.

As a result of this arrangement of a thread between the control plate 22 and the control sleeve 44, the limiting torque is constantly changed in accordance with the number of revolutions made by the clutch and coupling. The extent of the change is determined by the elasticity curve of the coupling. The interposition of this thread is dispensed with if a change in the limiting torque, dependent upon the angle through which the clutch rotates, is not necessary. The sleeve or collar 42 is then omitted and part 44' rests directly and loosely on 28 (Fig. 10). With an increasing torque also in this case 44' is displaced towards the right until 48 comes into contact with 12. As a result of the friction torque which is then produced 48 and 12 move together and operate as described above the actuating device (not shown) by way of the crown wheel 46.

On de-clutching of the friction clutch the springs 9, which load the friction plates 3 and 4 must be compressed as a result of the actuation of the clutch pedal. The force necessary for this purpose may be reduced to a minimum if care is taken that the tension of the springs is greater than the force at which slipping occurs by an amount, which is just sufficient to prevent undesired slipping.

Figure 7:
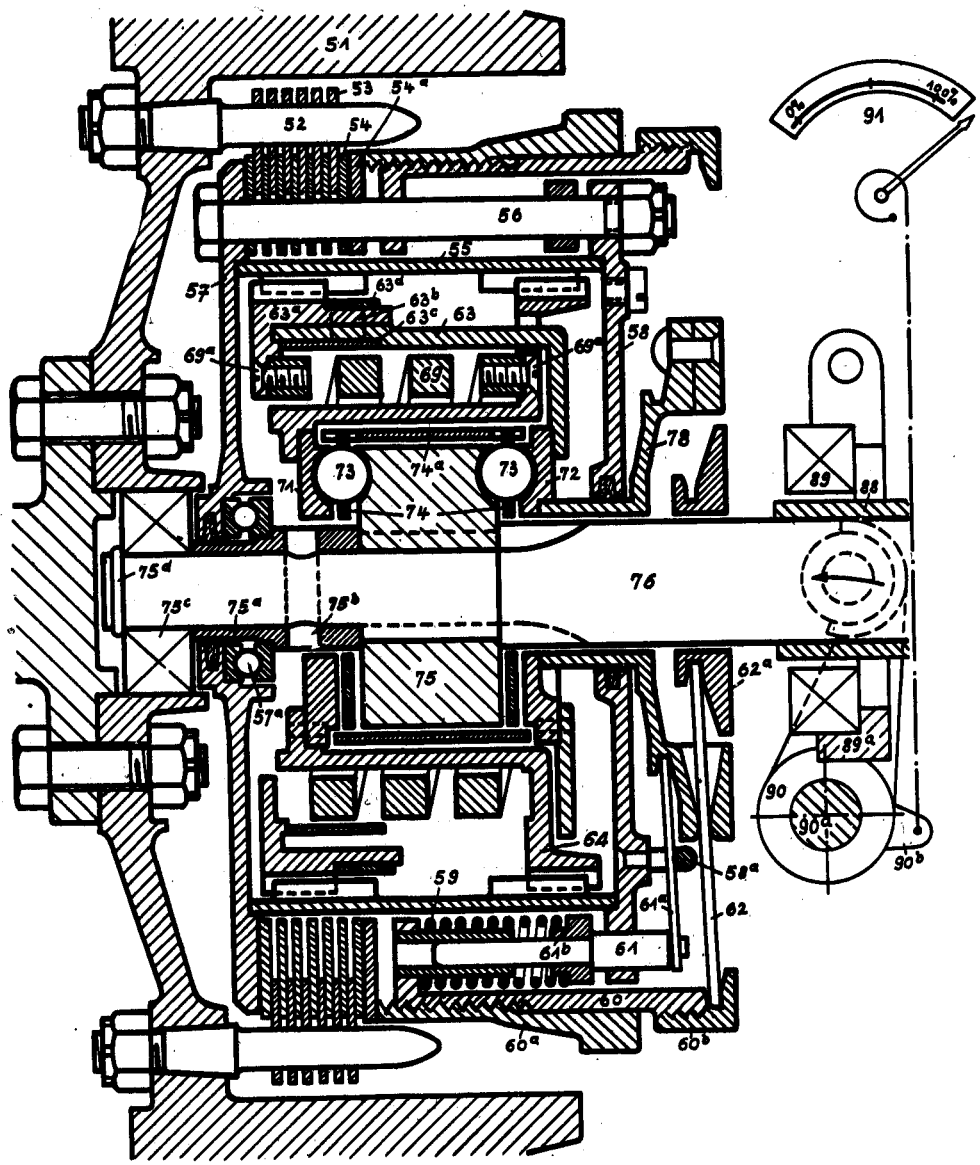
Fig. 7 shows a clutch constructed so that the tension of the springs which press together the friction plates becomes greater with the rising torque, the pressure exerted on the plate being sufficient to allow for unintentional slipping.

Fig. 7 shows a modified form of combined elastic coupling and clutch. The coupling comprises similar control elements as the couplings above described. In the flywheel 51, which is connected with the crank shaft, pins 52 are fixed, designed to carry along the outer plates 53. The inner plates 54 are connected by the bolts 56 to the coupling cylinder. The cover discs 57 and 58 are pressed by means of the bolts 56 as closures and guide discs against the cylinder 55. The cylinder and the cover discs are supported by the longitudinal bearing 57a and so that they cannot move towards the right. A movement in left hand direction is made impossible by the springs 59 loading the plates. These springs act on the control plate 72 and on the cover disc 58 through the levers 61a.

The external teeth of the arms 63 and 64 of the control device engage in the internal teeth of the cylinder 55. In the arms the accumulator spring 69 is fixed by the screws 69a. The arrangement is such that by this spring the control plates 71 and 72 with the control balls 73 are pressed against the control plate 75. In order to enable the insertion of the strong accumulating spring, the teeth are not directly made in the arms 63, a ring 63a being provided which is removably connected by six bolts 63b with three arms 63 as shown in Figure 11. The rings 63c and 63d prevent the bolts from dropping out. The balls 73 are guided by cages 74. External teeth of these cages engage in the apertures of a guide cylinder 74a, preventing relative rotation of the cages. The control plate 75 is mounted on the Cardan shaft 76, the control plates 71 and 72 and the control plate 75 have each the prescribed grooves. The motor torque is therefore transmitted upon the Cardan shaft 76 by the flywheel 51 through the pins 52, the friction plates 53 and 54, the bolts 56, the cover discs 57 and 58, the arms 63 and 64 and the control device.

A sleeve 78 is connected to the control plate 72. This sleeve controls six levers 61a, which turn each in a lug 58a. The lugs 58a are fixed in the cover disc 58 by riveting. The levers control through the intermediary of the bolts 61 and of the ring 61b the springs 59 loading the friction discs. The ring 61b takes up the centrifugal forces of the bolts 61 in that these bolts are carried by the ring 61b whereas they are movable with clearance on the disc 58 and cylinders 60. The bolts are further guided in the sleeves of the cylinder 60 and in bores of the cover disc 58. The loading springs 59 press upon the friction plates through the intermediary of the intermediate cylinder 60 and the readjusting sleeve 60a.

If, owing to increasing torque, the control device spreads, the sleeve 78 together with the control plate 72 shifts towards the right, the lever 61a turns in the lug 58a and further compresses the loading springs 59 for the friction plates. As proposed according to the invention, the loading of the friction plates is thereby increased in dependency on the torque loading. The sleeve 78 carries further a ring in which plate springs 62 acting as levers are placed. As long as the sleeve 62a is freely movable, the levers 62 turn through a movement of the control plate 72 in the abutments which are formed by the cylinder 60 and the screwed on ring 60b.

When the control plate 72 moves towards the right, the sleeve 62a shifts also towards the right until it encounters the ring controlled by the coupling pedal. If the torque further increases and the ring 89 is securely held in its position, the end of the lever situated in the sleeve 62a becomes the fulcrum. By further moving of sleeve 78 a force is exerted through the resilient lever 62 upon the cylinder 60, which counteracts the springs loading the friction plates. The friction plates are therefore relieved and begin to slip. If the coupling has to be released, the sleeve 62a is pushed towards the left by actuating the pedal. The force required corresponds always only to the security excess of the loading of the friction plates, so that the coupling begins to slip under the actually existing moment. A further increasing of the force required for the release is impossible as, when the lifting continues, the control discs or the sleeve 78 are shifted to the left according to the drop in moment, whereby the springs loading the friction plates are expanded according to the slighter moment, i. e. increasing of the force required for the operation does not occur.

The stroke of sleeve 62a is at the same time a measure for the torque transmitted by the coupling. If a pointer mechanism 91 with scale is connected with the lever of the coupling pedal 90b, the torque of the motor can be directly read on the scale, provided the same is suitably gauged and if the ring 89 is pressed against the sleeve 62a. It is thus possible to control the condition of the motor every time and to correct errors as soon as they arise.

As the coupling in ordinary service slips at a speed of rotation exceeding that of the engine by 5 to 10%, it is possible to engage the clutch.

The elastic coupling according to the invention can also find application in certain instances where motion is to be transmitted from a continuously moved member to a member whose resistance to movement varies so that it can only move in a jerky or step-by-step manner, the coupling acting alternately to store and deliver energy.

The elastic coupling according to the invention may also find employment where a mass is to be braked, in which case it is interposed between the mass and the brake itself and acts to smooth out irregularities.

I claim:—

1. In an elastic coupling, the combination of a plurality of control plates provided with grooves, means for pressing said plates towards one another, and rolling members arranged in said grooves between said plates adapted to transmit torque from one plate to another, the curvature at the deepest portion of the grooves having a greater radius than that of the rolling members, a clutch, an element extending from said clutch, a device adapted to cooperate with said element and actuated by said control plates to control said clutch on the attainment of a certain torque, and means adapted to cooperate with said element to limit the stroke of said plates and thereby determine the torque at which said device becomes operative to control said clutch.

2. In an elastic coupling, the combination of a plurality of control plates provided with grooves, means for pressing said plates towards one another, and rolling members arranged in said grooves between said plates adapted to transmit torque from one plate to another, the curvature at the deepest portion of the grooves having a greater radius than that of the rolling members, a clutch, an element extending from said clutch, sleeves rigidly connected to said control plates, and further sleeves screwed on to said first mentioned sleeves, said sleeves adapted to cooperate with said element and actuated by said control plates to control said clutch on the attainment of a certain torque, means capable of limiting rotation on said screwed on sleeves and adapted to cooperate with said element to limit the stroke of said plates and thereby determine the torque at which said device becomes operative to control said clutch.

3. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a clutch, an element extending from said clutch, sleeves rigidly connected to said control plates, and further sleeves screwed on to said first mentioned sleeves, said sleeves adapted to cooperate with said element and actuated by said control plates to control said clutch on the attainment of a certain torque, means capable of limited rotation on said screwed-on sleeves and adapted to cooperate with said element to limit the stroke of said plates and thereby determine the torque at which said device becomes operative to control said clutch, and an additional control device connected to said means adapted to adjust the relative positions of said sleeves to vary the maximum limit of torque.

4. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a clutch, an element extending from said clutch, a device adapted to cooperate with said element and actuated by said control plates to control said clutch on the attainment of a certain torque, and a centrifugal regulator adapted to cooperate with said element to limit the stroke of said plates and thereby determine the torque at which said device becomes operative to control said clutch.

5. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a clutch, levers connected at one end to said clutch, a device connected to one of said plates and engaging at an intermediate point of said levers and adapted to control said clutch on the attainment of a certain torque, and means engaging the other end of said levers adapted to limit the stroke of said plates and thereby determine the torque at which said levers become operative to control said clutch.

6. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a casing surrounding said plates, a shaft provided in said casing, a sleeve surrounding said shaft rigidly connected to one of said plates, a clutch surrounding said casing, a loading device for said clutch mounted on said casing, rocker levers, having their fulcrum on said casing and engaging said sleeve at one end and said loading device at the other end, a disengaging device connected to said clutch, further levers engaging said disengaging device at one end, extensions of said sleeve engaging an intermediary point of said last mentioned levers, and means engaging the other end of said levers adapted to limit the stroke of said plates and thereby determine the torque at which said last mentioned levers become operative to control said clutch.

7. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a clutch, levers connected at one end to said clutch, a device connected to one of said plates and engaging at an intermediate point of said levers and adapted to control said clutch on the attainment of a certain torque, and means engaging the other end of said levers adapted to limit the stroke of said plates and thereby determine the torque at which said levers become operative to control said clutch, and a device adapted to control, indicate and record the adjustment of said means and consequently the loading of the coupling.

8. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a clutch, resilient levers connected at one end to said clutch, a device connected to one of said plates and engaging at an intermediate point of said levers and adapted to control said clutch on the attainment of a certain torque, and means engaging the other end of said levers adapted to limit the stroke of said plates and thereby determine the torque at which said levers become operative to control said clutch.

9. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, a clutch, an element extending from said clutch, a control devise, normally stationary but adapted to rock after the engagement of said element with said control device to transmit independent movement.

10. In an elastic coupling, the combination of a plurality of control plates provided with grooves, rolling members arranged in said grooves between said plates adapted to transmit torque from one plate to another, the curvature at the deepest portion of the grooves having a greater radius than that of the rolling members, a casing enclosing said plates, a shaft journaled in said casing and carrying said plates, a clutch surrounding said casing, rims arranged on the inner side of said casing, toothed discs in said casing each rigidly connected to one of the outer of said plates and meshing with one of said toothed rims, and coupling springs between said discs to press together said control plates, said casing being filled with oil.

11. In an elastic coupling, the combination of a plurality of control plates provided with grooves, rolling members arranged in said grooves between said plates adapted to transmit torque from one plate to another, the curvature at the deepest portion of the grooves having a greater radius than that of the rolling members, a casing enclosing said plates, a shaft journaled in said casing and carrying said plates, a clutch surrounding said casing, rims arranged on the inner side of said casing, toothed discs in said casing each rigidly connected to one of said plates, an oil catching ring on one end of said casing, and tubes leading from said catching ring into the interior of said casing adapted to convey the oil caught in said ring into said casing.

12. In an elastic coupling, the combination of a plurality of control plates provided with grooves, rolling members arranged in said grooves between said plates adapted to transmit torque from one plate to another, the curvature at the deepest portion of the grooves having a greater radius than that of the rolling members, a casing enclosing said plates, a shaft journaled in said casing and carrying said plates, a clutch surrounding said casing, perforated discs connected one to each of the outer of said plates, bolts holding together said casing and extending through the perforations in said plates, and bolts adapted to transmit the torque of said casing to said plates through the intermediary of said discs.

13. In an elastic coupling, the combination of a plurality of control plates provided with grooves, rolling members arranged in said grooves between said plates adapted to transmit torque from one plate to another, the curvature at the deepest portion of the grooves having a greater radius than that of the rolling members, springs pressing together said control plates, a pot surrounding each of said springs, and rings surrounding said pots adapted to prevent the edging of said pots.

14. In an elastic coupling, the combination of a plurality of control plates provided with grooves, means for pressing said plates towards one another, rolling members arranged in said grooves between said plates adapted to transmit torque from one plate to another, the curvature at the deepest portion of the grooves having a greater radius than that of the rolling members, cages carrying said rolling members, and guide cams on said cages for maintaining said cages in their central position between said plates.

ALFRED KÄSTNER.